3,694,282
METHOD FOR THE CONNECTION OF THE ENDS OF BELTS

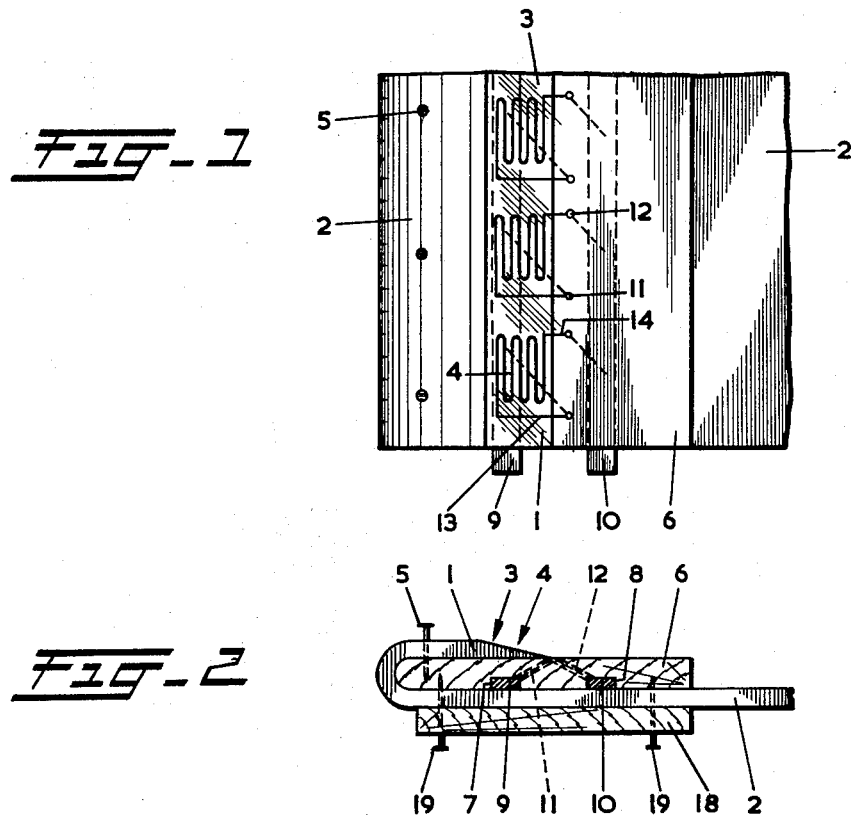
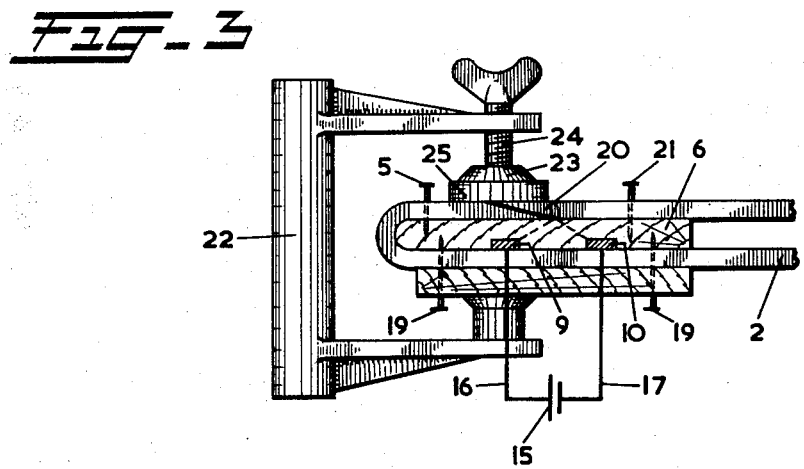

Hendrik Ribbels, 4 Marinus Naefflaan, Lochem, Netherlands, and Johannes Lefferts, 396 Brinkstraat, Enschede, Netherlands
Filed Mar. 3, 1969, Ser. No. 803,809
Claims priority, application Netherlands, Mar. 1, 1968, 6802950
Int. Cl. B31f 5/00
U.S. Cl. 156—157         3 Claims

ABSTRACT OF THE DISCLOSURE

Ends of the same or different belts are joined together by abutting the ends and temporarily connecting the ends to a rigid support element. The surface of at least one of the ends is coated with a medium which when heated joins the ends together and the same surface or the surface of the other end or both surfaces are provided with means which generates heat when the surfaces are in abutting relation. Such means may be an electrical resistance element embedded in the medium and connected in circuit with conductive members in the rigid element extending the width of the belt. After the belt ends are joined, the rigid support element is removed.

BRIEF SUMMARY OF THE INVENTION

The invention relates to a method and apparatus for connecting belts, more specifically for forming an endless belt.

In a known method, the ends of the belts to be connected are covered with a connecting medium and said ends are abutted in overlapping relation whereafter pressure and heat are applied to the ends to join the ends together.

Such known method is satisfactory for certain purposes, for example, the connection of the ends of belts for manufacturing endless conveyor belts. Difficulties arise, however, when very wide belts are to be formed into an endless conveyor belt, particularly when the connection can only be made when the belt is inside the apparatus in which the endless belt is required. An additional disadvantage of the known method is that in order to supply the joint area with sufficient heat, the belt has to be heated to such a high temperature that the material of the belts is adversely affected.

By way of example of such endless belts, a felt belt of a paper machine will be discussed hereafter, although naturally other belts can be formed according to the method of the invention.

Felt belts, as is known, in paper machines are very wide; presently a width of 10 metres is in use, and it requires a lot of work and time to mount an endless belt in such a machine, because all the rolls and rollers concerned have to be removed from it. If this is to be avoided, the belt has to be carried over the rolls and rollers in question and then the ends have to be connected with each other. It will be clear that this requires technical knowledge and experience and takes a lot of time and work. It is possible in such a case to provide the ends of the belts to be connected with a so-called train of clips, to interengage the clips with each other and to push a pin having a length equal to the width of the belt through the interengaged clips. Such a clipped connection is an open connection, however, that is to say there is a free passage where the connection is made. This is unacceptable in the case of a great many belts, particularly where felt belts of paper machines are concerned, because this causes marking of the paper web to be formed. It is possible to cover the clipped connection with a strip of textile to decrease the openings in the connection, but this is not satisfactory either where felt belts in a paper machine are concerned. Furthermore, it is difficult to push the long pin through the interengaged clips, because usually there is not enough space to maneuver with such a long pin (for example 10 metres) and because the clips have to be slipped inside each other just in front of the pin passing through the clips already slipped together, and this is difficult to do with a belt engaged in the machine. The connection formed by clips remains the weakest spot of the belt. There is always a lot of friction between the clips and the inserted pin during the operation; the felt is badly damaged where the clip is driven in; the friction between the clips and the machine rolls is very great when the machines are rotating at speed. It goes without saying that the aforesaid deficiencies have a great influence on the durability of the belt.

To connect the ends of a belt by the known method is a time-consuming procedure and requires great experience where wide belts placed inside the machine are concerned.

It is therefore an object of the invention to provide a method and an apparatus which eliminates all the aforementioned disadvantages.

This object is achieved according to the invention by the fact that means are provided on at least one of the prepared ends of the belt for the production of heat at the site where the prepared ends of the belt are in contact with each other.

Thereby, it is now possible for the ends to be fully prepared where the belts are manufactured, so that in making the connection between the ends of the belt in the machine, the ends will only have to be pressed against each other, which simplifies the procedure considerably.

The means mentioned above for the development of heat at the site where the surfaces of the prepared ends of the belt are in contact with each other may be chemical agents which have been introduced in the connecting medium, one constituent being provided on the surface of one end and the other constituent on the surface of the other end, said constituents reacting when both surfaces are pressed together to give off heat.

Preferably, however, at least one electrical conductor is provided on one of the prepared ends. This is the most simple arrangement. One or both ends is coated with a special connecting medium, preferably in the factory where the belts are manufactured, said connecting medium being a thermoplastic resin which is hardened at normal room temperature, and has bonding properties at a raised temperature. After the ends have been pressed together, the electrical conductor which has been provided on one of the aforesaid ends is connected to a power source, causing heat to develop at the site of the connecting medium and the connection is made after removal of the pressure and cooling.

In order to enable even an inexperienced person to use the method and apparatus of the invention in a simple way, the end provided with the electrical conductor and the connecting medium is preferably temporarily attached to an element having a length substantially equal to the length of the connection to be made. The other end of the belt, which may also be provided with the connecting medium, is also temporarily attached to said element, with the two prepared ends in overlapping abutment, and pressure is exerted on the site of the connection to be made, while the conductor is also connected to the power source. The power source is disconnected after a particular period of time, the pressure is removed and the aforesaid element removed whereupon the ends of the belt are smoothly and permanently joined together.

It now becomes possible to prepare the ends of the belt in the factory where the belt is manufactured, for example to bevel them off, to provide one of the ends with the electrical conductor and the connecting medium (which may also be placed on the other end) and to attach the one end thus prepared temporarily to said element which may be in the form of a rigid bar or beam, and to provide the connection for the power source. The belt can now be coiled around said element and stored until ready for use. The user only has to guide said other end of the belt through the machine, temporarily attach said other end to said element with the ends in overlapping abutting relation, exert pressure on the site of the connection to be made, and to connect the power source to the electrical conductor. After a certain period of time, the power source can be disconnected and the element can be detached after which the connection has been completed.

The conductor preferably consist of a series of resistance elements, the free ends of which protrude outside the connection to be made.

Said ends are attached to the aforementioned element with two live wires present therein to which the power source can be connected.

If there is suitable equipment available, it is also possible to distribute particles of metal in the connecting medium and to generate heat by induction.

The connecting medium may also be formed by a strip of material with the conductor embedded in it, said material reacting at a raise in temperature to form the connection.

Where a belt of a paper machine is concerned, it is most important to avoid so-called markings on the paper web to be formed, by taking care that the whole surface all over the belt allows the same amount of passage, particularly at the site of the connection. This may be achieved, in a manner known per se, by providing the connecting medium in a dotted, line or other pattern, for example with the aid of a stencil.

BRIEF DESCRIPTION OF THE DRAWING

FIG. 1 is a top plan view of one of the ends of the belt prepared to form the connection, FIG. 2 is a side view of the arrangement in FIG. 1, and FIG. 3 is a side view of the apparatus in readiness for effecting the connection.

DETAILED DESCRIPTION

An end 1 of the belt 2 is bevelled off and a layer of connecting medium 3 is applied thereto. A conductor in the form of a number of resistance elements 4 is embedded in the connecting medium. The belt 2 is then temporarily attached to an element 6, in the form of a rigid bar or beam, by means of fasteners 5. In the element 6 two parallel grooves 7 and 8 have been provided on the side facing the side on which the prepared end 1 of the belt 2 has been fastened. Two metal rods 9 and 10 (for example copper) are fitted into grooves 7 and 8. From the edge of the prepared end 1, holes 11 and 12 have been drilled in element 6, holes 11 extending to groove 7 and holes 12 extending to groove 8 in such a manner, that, as seen in FIG. 1, the left end 13 of each resistance element 4 is inserted into hole 11 and each right end 14 of each resistance element 4 is inserted in each of the holes 12 and extending to the inside of the grooves 7 and 8 respectively. The rods 9 and 10 are inserted into the corresponding grooves, after the ends of the resistance elements have been inserted into the holes and grooves so that there is contact between the wires 13 and 14 and the said rods. Said rods 9 and 10 are provided at one of their ends with a terminal or the like, not shown in the drawing, to connect a power source 15 via the wires 16 and 17. The belt 2 is then passed over the element 6 and temporarily fastened with the fasteners 19 via a strip or beam 18, so that the rods 9 and 10 are confined. The belt is now wrapped around the element and sent to the buyer, after the other end 20 of the belt 2 is coated with the connecting medium, if desired.

The buyer unrolls the belt 2 from the element 6 and introduces the belt in the machine. The end of the belt 20 is then temporarily secured to the element 6 by means of the fasteners 21 in such a way that the prepared ends are overlapped in abutting relation as shown in FIG. 3. A number of clamps 22 are then positioned along the width of the belt and the threaded bases 23 of the clamps are turned so that pressure is exerted over the total length of the connection to be made via a rigid strip or beam 25. Such clamps can be supplied by the producer of the belt and have been constructed in such a way that each clamp exerts the same clamping force, for example by reason of the fact that the screw thread has a predetermined length or by tightening the bases with a maximum predetermined torque. The rods 9 and 10 are then connected to the power source 15 and the joint or connection is made.

When the connection has been completed, the clamps 22, the strips 18 and 25 and the element 6 are removed and returned to the producer of the belt. The belt which is now continuous can be stretched and the protruding ends of the wires 13 and 14 are cut.

It will be obvious that a smooth joint can be formed simply and with very few instructions in a very short period of time, even if the connection has to be made when the belt has been mounted in the machine. Although the invention has been described with reference to the connection of the ends of a belt to form an endless belt, it is obvious that the process may also be adopted for the connection of any two ends without producing an endless belt, without any modifications being necessary.

By way of illustration of the operating parameters, when a 12-volt battery is used with resistance elements consisting of wire with a diameter of 0.5 mm., 8 to 15 elements are used per meter, developing a temperature at the site of the joint within a range of 200–220° C. In order to effect such an increase in temperature by supplying heat from the surface of the belt, as in the known processes, this surface has to be heated to such a temperature that the material of the belt is detrimentally effected. According to the process of the invention the material of the belt is hardly affected by the short period of temperature increase.

It will be obvious that other forms of conductors may be provided at the site of the connection to be made.

As for the connecting medium, this is preferably a temperature-sensitive adhesive substance, such as for example a mixture of equal parts of polyvinylchloride and polyvinylacetate. Other well known adhesive substances can also be used.

What is claimed is:

1. A method for mutually connecting the ends of a felt belt after being introduced in a paper machine, said method comprising applying a heat sensitive adhesive and an electric resistance element to at least one of the belt ends, temporarily securing said one belt end to a rigid element, having a width at least equal to the width of the belt, passing the belt through the paper machine and temporarily securing the other end of said belt to said rigid element in abutting relationship with said one end of said belt, connecting said electric resistance element to an electric power source for a period of time sufficient to cause bonding of the heat sensitive adhesive to the contacting surface of the belt end, and disconnecting the now mutually connected belt end from said rigid element.

2. A method as claimed in claim 1 wherein the said resistance element is formed as a plurality of individual segments of which the ends are brought into electrical contact with conductive members arranged in grooves extending the length of said rigid element.

3. A method as claimed in claim 1 comprising applying clamping pressure to said ends while the resistance element is being heated.

References Cited
UNITED STATES PATENTS

| | | | |
|---|---|---|---|
| 2,952,578 | 9/1960 | Carlson | 156—275 X |
| 3,049,465 | 8/1962 | Wilkins | 156—275 |
| 2,964,444 | 12/1960 | Lynn | 156—275 |
| 3,235,289 | 2/1966 | Jones | 156—275 X |

CARL D. QUARFORTH, Primary Examiner

S. J. LECHERT, JR., Assistant Examiner

U.S. Cl. X.R.

156—159, 275, 304, 309

UNITED STATES PATENT OFFICE
CERTIFICATE OF CORRECTION

Patent No. 3,694,282        Dated September 26, 1972

Inventor(s) Hendrik Ribbels, et. al.

It is certified that error appears in the above-identified patent and that said Letters Patent are hereby corrected as shown below:

In the heading column 1, line 6, after "Netherlands", insert -- assignors to Textielmaatschappij Haaksbergen N.V. -- .

Signed and sealed this 1st day of May 1973.

(SEAL)
Attest:

EDWARD M. FLETCHER, JR.         ROBERT GOTTSCHALK
Attesting Officer        Commissioner of Patents